United States Patent …

(12) United States Patent
Niwa et al.

(10) Patent No.: US 8,792,313 B2
(45) Date of Patent: Jul. 29, 2014

(54) MAGNETIC RECORDING MEDIUM HAVING MULTIPLE UNDER LAYERS FOR HEAT-ASSISTED MAGNETIC RECORDING APPARATUS

(71) Applicant: Showa Denko K.K., Tokyo (JP)

(72) Inventors: Kazuya Niwa, Ichihara (JP); Tetsuya Kanbe, Ichihara (JP); Yuji Murakami, Ichihara (JP); Lei Zhang, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/972,041

(22) Filed: Aug. 21, 2013

(65) Prior Publication Data

US 2014/0064047 A1    Mar. 6, 2014

(30) Foreign Application Priority Data

Aug. 29, 2012    (JP) ................................ 2012-189237

(51) Int. Cl.
*G11B 11/00*    (2006.01)

(52) U.S. Cl.
USPC ................. 369/13.33; 369/13.13; 369/13.38; 428/831; 428/832.2

(58) Field of Classification Search
CPC .............................................. G11B 2005/0032
USPC .................................. 369/13.33, 13.13, 13.4
See application file for complete search history.

(56) References Cited

U.S. PATENT DOCUMENTS

| 6,432,563 | B1 * | 8/2002 | Zou et al. ................. 428/826 |
| 2007/0122659 | A1 * | 5/2007 | Osawa et al. ............. 428/831 |
| 2010/0182714 | A1 * | 7/2010 | Kanbe et al. ............. 369/13.33 |
| 2012/0300600 | A1 * | 11/2012 | Kanbe et al. ............. 369/13.33 |
| 2013/0194901 | A1 * | 8/2013 | KANBE et al. ............ 369/13.33 |

FOREIGN PATENT DOCUMENTS

JP    11-353648 A    12/1999

OTHER PUBLICATIONS

Yang, et al., "Structure and magnetic properties of L10-FePt thin films on TiN/RuAl underlayers" Journal of Applied Physics, vol. 109, 07B770 (2011).

* cited by examiner

*Primary Examiner* — Tan X Dinh
(74) *Attorney, Agent, or Firm* — Sughrue Mion, PLLC

(57) ABSTRACT

A magnetic recording medium of the present invention includes an under layer formed on a substrate, and a magnetic layer, formed on the under layer, which contains an alloy having an $L1_0$-type crystal structure as a main component. The under layer includes, in order from the substrate side, a first under layer with a lattice constant a of 2.87 Å≤a<3.04 Å, a second under layer having a BCC structure with a lattice constant a of 3.04 Å≤a<3.18 Å, a third under layer having a BCC structure with a lattice constant a of 3.18 Å≤a<3.31 Å, and an upper under layer having a NaCl-type crystal structure. The first under layer has a B2 structure, or has a BCC structure containing Cr as a main component. In the magnetic recording medium of the present invention, information is recorded using a heat-assisted magnetic recording type, or a microwave-assisted magnetic recording type.

7 Claims, 3 Drawing Sheets

MAGNETIC RECORDING MEDIUM HAVING MULTIPLE UNDER LAYERS FOR HEAT-ASSISTED MAGNETIC RECORDING APPARATUS

BACKGROUND OF THE INVENTION

1. Field of the Invention

The present invention relates to a magnetic recording medium of a heat-assisted magnetic recording type or a microwave-assisted magnetic recording type which is used in a hard disk drive (HDD) and the like, and a magnetic recording and reproducing apparatus.

Priority is claimed on Japanese Patent Application No. 2012-189237, filed on Aug. 29, 2012, the content of which is incorporated herein by reference.

2. Description of Related Art

In order to increase the recording capacity of a hard disk drive, an increase in the recording density of a medium has been progressed. However, it is difficult to increase the recording density of a medium due to a problem, referred to as a so-called trilemma, that it is difficult to simultaneously establish particle size fineness, thermal stability characteristics, and recording characteristics. Heat-assisted magnetic recording types are expected as a method of solving such a trilemma, and research development has been actively conducted.

The heat-assisted magnetic recording type is a recording type that reduces a medium coercive force and performs writing, by irradiating a medium with near-field light using a magnetic head, and locally heating the medium surface.

Materials having high crystal magnetic anisotropy Ku are used in a medium magnetic layer of this heat-assisted magnetic recording type, thereby allowing the volume of a magnetic particle to be reduced in a state where KuV/kT (Ku: magnetic anisotropy constant, V: particle volume, k: Boltzmann constant, and T: temperature) which is a thermal stability index is maintained.

As such high Ku materials, ordered alloys such as FePt (Ku to $7 \times 10^7$ erg/cm$^3$) and CoPt (Ku to $5 \times 10^7$ erg/cm$^3$) having an $L1_0$-type crystal structure are known.

In order to obtain a heat-assisted magnetic recording medium exhibiting high crystal magnetic anisotropy, it is necessary to cause an alloy of a magnetic layer having an $L1_0$-type crystal structure to have a good (001) orientation. Since the orientation of the magnetic layer is controlled by an under layer, it is necessary to appropriately select a material of the under layer.

For example, Japanese Unexamined Patent Application, First Publication No. H11-353648 discloses that a FePt magnetic layer exhibits a (001) orientation by using a MgO under layer. In addition, J. Appl. Phys., Vol. 109, 07B770 (2011) discloses that a FePt magnetic layer exhibits a good (001) orientation by using a RuAl under layer and a TiN under layer.

In addition, as another technique which is attracting attention as a next-generation recording type, there is a microwave-assisted magnetic recording type. The microwave-assisted magnetic recording type is a type of inclining a magnetization direction from a magnetization easy axis by irradiating a magnetic layer of a magnetic recording medium with microwaves, and recording magnetic information by locally switching the magnetization of the magnetic layer.

In the microwave-assisted magnetic recording, such as a heat-assisted magnetic recording, it is also possible to use a high Ku material, made of an alloy having an $L1_0$-type crystal structure, as a material of the magnetic layer. It is essential to reduce the particle size of the magnetic layer in order to further improve recording density. For that reason, in the microwave-assisted magnetic recording type, a magnetic recording medium is also required which is made of an alloy having an $L1_0$-type crystal structure capable of maintaining thermal stability even when the size of a magnetic particle is reduced.

SUMMARY

In a heat-assisted magnetic recording medium, in order to obtain good magnetic recording characteristics, it is important to cause a magnetic layer made of an alloy having an $L1_0$-type crystal structure to take a good (001) orientation.

When a FePt alloy is used in the magnetic layer, a Cr alloy, RuAl, MgO, TiN, or the like is widely used as an under layer. However, in the related art, the (001) orientation of a magnetic layer made of an alloy having an $L1_0$-type crystal structure is insufficient, and thus, in order to further improve recording density, it is necessary to further improve the orientation of the magnetic layer used in the heat-assisted magnetic recording medium.

In addition, in the microwave-assisted magnetic recording medium, it is also necessary to further improve the orientation of the magnetic layer made of an alloy having an $L1_0$-type crystal structure.

The present invention is proposed in view of such circumstances, and an object thereof is to provide a heat-assisted magnetic recording medium capable of obtaining a high coercive force and a high signal-to-noise ratio (SNR) by including a magnetic layer made of an alloy having an $L1_0$-type crystal structure, the magnetic layer having a good (001) orientation, and a magnetic recording and reproducing apparatus provided therewith.

In addition, another object of the present invention is to provide a microwave-assisted magnetic recording medium in which a magnetic layer made of an alloy having an $L1_0$-type crystal structure is included, and the magnetic layer has a good orientation, and a magnetic recording and reproducing apparatus provided therewith.

Such a problem can be solved by using a magnetic recording medium including: an under layer formed on a substrate; and a magnetic layer, formed on the under layer, which contains an alloy having an $L1_0$-type crystal structure as a main component, wherein the under layer includes, in order from the substrate side, a first under layer of with a lattice constant a of 2.87 Å≤a<3.04 Å, a second under layer having a BCC structure with a lattice constant a of 3.04 Å≤a<3.18 Å, a third under layer having a BCC structure with a lattice constant a of 3.18 Å≤a<3.31 Å, and an upper under layer having a NaCl-type crystal structure, and the first under layer has a B2 structure, or has a BCC structure containing Cr as a main component.

An aspect of the present invention provides a magnetic recording medium having the following characteristics.

(1) A magnetic recording medium including: an under layer formed on a substrate; and a magnetic layer, formed on the under layer, which contains an alloy having an $L1_0$-type crystal structure as a main component, wherein the under layer includes, in order from the substrate side, a first under layer with a lattice constant a of 2.87 Å≤a<3.04 Å, a second under layer having a BCC structure with a lattice constant a of 3.04 Å≤a<3.18 Å, a third under layer having a BCC structure with a lattice constant a of 3.18 Å≤a<3.31 Å, and an upper under layer having a NaCl-type crystal structure, the first under layer has a B2 structure, or has a BCC structure containing Cr as a main component, and information is recorded using a heat-assisted magnetic recording type or a microwave-assisted magnetic recording type.

An aspect of the present invention can be as follows.

A magnetic recording medium including: an under layer formed on a substrate; and a magnetic layer, formed on the under layer, which contains an alloy having an $L1_0$-type crystal structure as a main component, wherein the under layer includes, in order from the substrate side, a first under layer with a lattice constant a of 2.87 Å≤a<3.04 Å, having a B2 structure, or having a BCC structure containing Cr as a main component, a second under layer having a BCC structure with a lattice constant a of 3.04 Å≤a<3.18 Å, a third under layer having a BCC structure with a lattice constant a of 3.18 Å≤a<3.31 Å, and an upper under layer having a NaCl-type crystal structure, and information is recorded using a heat-assisted magnetic recording type or a microwave-assisted magnetic recording type.

(2) The magnetic recording medium according to the above (1),
wherein the first under layer is made of Cr and has a BCC structure, or contains Cr as a main component, and contains at least one of Ti, V, Mo, W, Nb, Ta, Mn, and Ru, and has a BCC structure.

(3) The magnetic recording medium according to the above (1), wherein the first under layer contains NiAl or RuAl, and has a B2 structure.

(4) The magnetic recording medium according to any one of the above (1) to (3), wherein the second and third under layers contain Cr, Mo, Nb, Ta, V, or W; or contain Cr, Mo, Nb, Ta, V, or W as a main component, and contain at least one of Cr, Ti, V, Mo, W, Nb, Ta, Mn, and Ru.

(5) The magnetic recording medium according to any one of the above (1) to (4), wherein the magnetic layer has an $L1_0$-type crystal structure, contains a FePt alloy or a CoPt alloy as a main component, and contains at least one selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C.

(6) A magnetic recording and reproducing apparatus including: the magnetic recording medium according to any one of the above (1) to (5); a medium driving portion that drives the magnetic recording medium in a recording direction; a magnetic head that includes a laser generation portion which heats the magnetic recording medium, a waveguide which guides laser light generated from the laser generation portion to a front end portion, and a near-field generating element provided at the front end portion, and performs a recording operation and a reproducing operation on the magnetic recording medium; a head moving portion that moves the magnetic head relative to the magnetic recording medium; and a recording and reproducing signal processing system that performs signal input to the magnetic head and reproduction of an output signal from the magnetic head.

(7) A magnetic recording and reproducing apparatus including: the magnetic recording medium according to any one of the above (1) to (5); a medium driving portion that drives the magnetic recording medium in a recording direction; an element that irradiates the magnetic recording medium with microwaves; a magnetic head that performs a recording operation and a reproducing operation on the magnetic recording medium; a head moving portion that moves the magnetic head relative to the magnetic recording medium; and a recording and reproducing signal processing system that performs signal input to the magnetic head and reproduction of an output signal from the magnetic head.

According to an aspect of the present invention, it is possible to realize a magnetic recording medium in which a magnetic layer has a good (001) orientation, and which exhibits a high coercive force and a high signal-to-noise ratio (SNR).

DETAILED DESCRIPTION OF THE PREFERRED EMBODIMENTS

Hereinafter, an embodiment of the present invention will be described in detail. Meanwhile, the present invention is not limited to the following examples. Numerical quantities, configurations, positions, materials, and the like may be changed except as otherwise limited herein.

[Heat-Assisted Magnetic Recording Medium]

Figure 1:
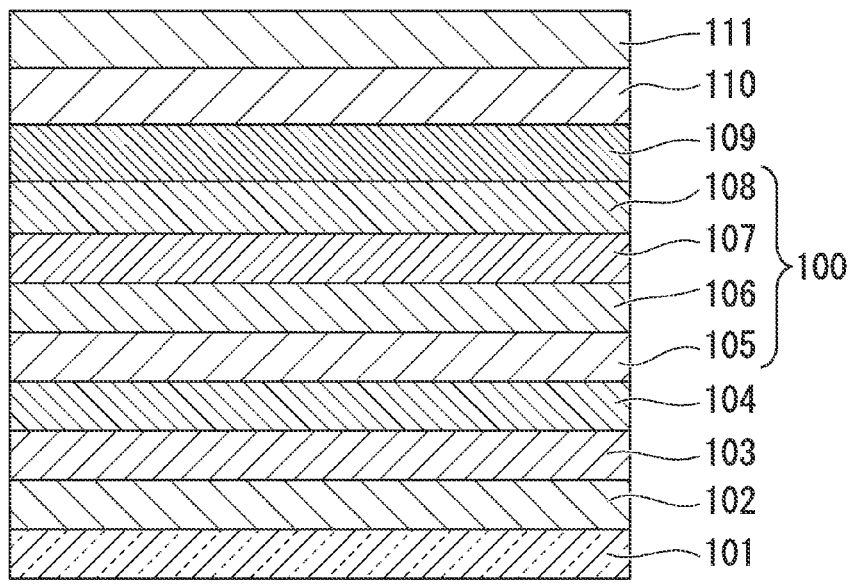
FIG. 1 is a cross-sectional view illustrating an example of a heat-assisted magnetic recording medium of the present invention.

FIG. 1 is a cross-sectional view illustrating an example of a heat-assisted magnetic recording medium of the present invention.

The heat-assisted magnetic recording medium of FIG. 1 is configured such that an adhesion layer 102, a heat sink layer 103, and a seed layer 104 are formed on a substrate 101, an under layer 100 is formed on the seed layer 104, and a magnetic layer 109, a protective film 110, and a lubricant layer 111 are sequentially formed thereon.

The under layer 100 has a structure in which a first under layer 105, a second under layer 106, a third under layer 107, and an upper under layer 108 are sequentially laminated. An upper under layer 108 has a NaCl-type crystal structure as described later.

Substrate

In an aspect of the present invention, a circular non-magnetic substrate or the like can be used as the substrate 101 used in the heat-assisted magnetic recording medium. For example, glass, aluminum, ceramics or the like can be used as a non-magnetic substrate, and crystallized glass, amorphous glass, tempered glass or the like can be used as a glass substrate.

As the substrate 101 used in the heat-assisted magnetic recording medium, it is preferable to use a substrate which has a high glass transition point and an excellent heat resistance, and surface roughness, heat capacity, a crystallization state and the like can be appropriately selected and used in accordance with the film-forming conditions of each layer formed on the substrate 101, the conditions of use the magnetic recording medium and the like.

Adhesion Layer

The adhesion layer 102 is used for improve adhesion between the heat sink layer 103 and the substrate 101, and the material thereof is not particularly limited insofar as the materials have excellent adhesion and surface flatness, but includes CrTi, NiTa, AlTi, CoTi, NiTaZr or the like.

Meanwhile, the presence or absence of the adhesion layer 102 does not limit the scope of the present invention.

Heat Sink Layer

The heat sink layer 103 is used for reducing a transition width by diffusing heat accumulated in the magnetic layer 109 in a vertical direction to suppress the spread of the heat in a horizontal direction, and rapidly dissipating the heat accumulated in the magnetic layer 109 after recording. The heat sink layer may be included as necessary. The material of the heat sink layer 103 includes an alloy having high thermal conductivity or the like which contains Ag, Al, Cu, W, Mo or these elements as a main component.

In order to effectively dissipate the heat of the magnetic layer 109, the distance between the heat sink layer 103 and the magnetic layer 109 is preferably set to be short, and the thickness of the under layer disposed between the heat sink layer 103 and the magnetic layer 109 is preferably set to be small in a range of not damaging the control function of the particle size and the orientation of the magnetic layer 109.

In the heat-assisted magnetic recording medium shown in FIG. 1, the heat sink layer 103 is disposed at a position close to the substrate 101. However, insofar as the control function of the particle size and the orientation of the magnetic layer 109 can be maintained, the heat sink layer 103 may be provided immediately below the magnetic layer 109, and may also be provided at any position between the first under layer 105 and the upper under layer 108. Any position between the first under layer 105 and the upper under layer 108 means a position, for example, between the first under layer 105 and the second under layer 106, or between the third under layer 107 and the upper under layer 108. The heat sink layer 103 may be provided between the seed layer 104 and the first under layer 105. Meanwhile, the presence or absence of the heat sink layer 103 does not limit the scope of the present invention.

Seed Layer

The seed layer 104 shown in FIG. 1 is a layer provided in order to cancel out the (111) orientation of the heat sink layer 103 located thereunder and cause the first under layer 105 to take a good (100) orientation. The material of the seed layer 104 includes an amorphous material such as CrTi, NiTa, or AlTi. In addition, a soft magnetic material may be used in the seed layer 104. When the orientation of the first under layer 105 of the magnetic recording medium is set to be (100), and exhibits a sufficient orientation, the seed layer 104 is not necessarily required, and thus the presence or absence of the seed layer 104 does not limit the scope of the present invention.

First Under Layer

The first under layer 105 is formed as a layer for controlling the particle sizes and the orientations of the under layers 106, 107, and 108, and the magnetic layer 109 which are located upward thereof.

The first under layer 105 has a B2 structure with a lattice constant a of 2.87 Å≤a<3.04 Å (0.287 nm≤a<0.304 nm), or has a BCC structure containing Cr as a main component with a lattice constant a of 2.87 Å≤a<3.04 Å (0.287 nm≤a<0.304 nm).

The configuration material of the first under layer 105 can be made of, for example, Cr; or contain Cr as a main component, and contain at least one of Ti, V, Mo, W, Nb, Ta, Mn, and Ru.

That is, the first under layer 105 may be a layer which is made of Cr and has a BCC structure, or contains Cr as a main component, and contains at least one of Ti, V, Mo, W, Nb, Ta, Mn, and Ru, and has a BCC structure.

The second under layer 106 formed on the first under layer 105 exhibits a good (100) orientation through epitaxial growth.

Meanwhile, the main component means the corresponding component is contained for example, at 50 at % or more (or in excess of 50 at %).

Specifically, for example, the first under layer 105 having a (100) orientation can be formed by a method of forming a Cr alloy on the substrate 101 heated at appropriately 250° C., or the like. The thickness of the first under layer 105 is preferably set to be equal to or more than 2 nm in order to form a good (100) orientation.

Cr, V, Mo, W, Nb, and Ta typically form a BCC structure, but in a simple substance, Ru takes an HCP structure, and does not form a BCC structure. In addition, the simple substances of Ti and Mn do not also take a BCC structure under the heating conditions of approximately 250° C.

However, when a small amount of at least one of Ru, Ti, and Mn is contained using an element, such as Cr, having a BCC structure as a main component, a good (100) orientation is exhibited.

The orientation of the first under layer 105 is preferably (100). However, even when a (111) orientation or a (110) orientation is included to some extent, a function as the first under layer is exhibited.

The first under layer 105 may be a layer which contains RuAl or NiAl, and has a B2 structure. The first under layer 105 having a B2 structure exhibits a (100) orientation just like the first under layer 105 having a BCC structure, and thus functions as an under layer for forming the (100) orientation of the second under layer 106 located thereon.

In the present specification, regarding a lattice constant of each element in the first to third under layers 105 to 107, the upper under layer 108 and the like, as a lattice constant when a BCC crystal structure is formed in each layer, the disclosure in Metal Data Book 4th Revision of the Japan Institute of Metals is used as follows: Cr: 2.884 Å, V: 3.023 Å, Mo: 3.147 Å, W: 3.165 Å, Nb: 3.307 Å, Ta: 3.298 Å, Ti: 3.307 Å, and Mn: 3.081 Å. In addition, regarding Ru, a value of a lattice constant of 3.072 Å calculated from an atomic radius is used on the assumption that Ru forms a BCC structure.

The lattice constant of an alloy constituting the under layers 105 to 108 and the like is a value of a weighted average calculated by multiplying a lattice constant of each constituent element by an abundance ratio, or a value calculated from a so-called Vegard's law. For example, in a case where the first under layer 105 made of Cr-10 at % Nb of the magnetic recording medium in FIG. 1, the lattice constant of Cr is 2.884 Å, and the lattice constant of Nb is 3.307 Å, and thus the lattice constant of a Cr-10 at % Nb alloy can be calculated as 2.92 Å. Meanwhile, the relation of 10 Å=1 nm is established.

Second Under Layer

The second under layer 106 has a BCC structure with a lattice constant a of 3.04 Å≤a<3.18 Å (0.304 nm≤a<0.318 nm).

The configuration material of the second under layer 106 contains Cr, Mo, Nb, Ta, V, or W; or contains Cr, Mo, Nb, Ta, V, or W as a main component, and contains at least one of Cr, Ti, V, Mo, W, Nb, Ta, Mn, and Ru.

The second under layer 106 is a layer provided in order to relax the lattice mismatching between the first under layer 105 and the third under layer 107, and improve the (100) orientation of the third under layer 107. For that reason, the lattice constant of the second under layer 106 is equivalent to an intermediate value between the lattice constants of the first under layer 105 and the third under layer 107. The thickness of the second under layer 106 is preferably set to be equal to or more than 2 nm in order to form a good (100) orientation.

In addition, when a Cr alloy is used in the second under layer 106, it is considered that wettability to the first under layer 105 made of a Cr alloy is improved. In addition, when Ta, W, Mo or the like is added to the material of the second under layer 106, it is also possible to improve the mechanical characteristics of the magnetic recording medium.

Third Under Layer

The third under layer 107 has a BCC structure with a lattice constant a of 3.18 Å≤a<3.31 Å (0.318 nm≤a<0.331 nm).

The configuration material of the third under layer 107 contains Cr, Mo, Nb, Ta, V, or W; or contains Cr, Mo, Nb, Ta, V, or W as a main component, and contains at least one of Cr, Ti, V, Mo, W, Nb, Ta, Mn, and Ru.

The third under layer 107 causes the upper under layer 108 having a NaCl structure formed thereon to take a good (100) orientation, and introduces moderate in-plane stress. It is possible to enhance SNR by increasing the lattice constant of the third under layer 107, and introducing in-plane stress into the under layer having a NaCl structure. A range of 3.18 Å≤a<3.31 Å is adopted as a value of a lattice constant by which lattice mismatching with the second under layer 106 does not increase, and moderate stress can be introduced into the under layer having a NaCl structure.

Upper Under Layer

The upper under layer 108 having a NaCl structure (NaCl-type crystal structure) can be formed on the third under layer 107. The configuration material of the upper under layer 108 includes, specifically, an oxide such as MgO, TiO, and NiO, a nitride such as TiN, TaN, NbN, and HfN, and a carbide such as TaC and TiC.

Since the third under layer 107 exhibits a (100) orientation, the upper under layer 108 having a NaCl structure also exhibits a (100) orientation through epitaxial growth. For that reason, the magnetic layer 109 can be caused to take a good (001) orientation by forming the magnetic layer 109, containing a FePt alloy or a CoPt alloy as a main component, which has an $L1_0$-type crystal structure, on the upper under layer 108.

The upper under layer 108 is preferably made of a material which does not have a large difference of a lattice constant with respect to the magnetic layer 109. The lattice constants of MgO and TiN are 4.21 Å and 4.23 Å, respectively, and thus are approximate to an axial length a (3.85 Å) of the magnetic layer 109 containing a FePt alloy having an $L1_0$-type crystal structure as a main component and an axial length a (3.81 Å) of the magnetic layer 109 containing a CoPt alloy having an $L1_0$-type crystal structure as a main component. For that reason, as materials of the upper under layer 108, MgO and TiN are particularly preferably used.

In addition, the material of the upper under layer 108 is preferably a material in which one of oxygen, nitrogen, and carbon and a metal are contained at a ratio of 1:1 (molar basis), but some amounts of an oxide and a nitride which do not have a ratio of 1:1 may be mixed.

In the magnetic recording medium shown in FIG. 1, the MgO upper under layer 108 (upper under layer 108 made of MgO) can be illustrated as the upper under layer 108 having a NaCl structure. The thickness of the MgO upper under layer 108 is preferably set to 0.5 nm to 15 nm in order to obtain the magnetic layer 109 exhibiting a uniform and good orientation.

When the thickness of the MgO upper under layer 108 is less than the above-mentioned range, a function of controlling the magnetic layer 109 is not sufficiently obtained, and it is not likely that a good (001) orientation of the magnetic layer 109 is obtained. In addition, when the thickness of the MgO upper under layer 108 exceeds the above-mentioned range, there is a tendency for the thickness of the MgO upper under layer 108 to become non-uniform. Thus, an orientation control function of the magnetic layer 109 is not sufficiently obtained, and the flatness thereof may become insufficient.

The MgO upper under layer 108 can be formed using, for example, an RF discharge deposition method in which a MgO target is used, or a DC discharge deposition method in which a metal target made of Mg and a gas containing $O_2$ are used.

In the present invention, in order to improve the writing characteristics of the heat-assisted magnetic recording medium, a soft magnetic under layer may be formed at any position located downward of the magnetic layer 109.

When the soft magnetic under layer is formed, it is possible to enhance a magnetic field gradient applied to the magnetic layer 109. In addition, when the soft magnetic under layer is included in the magnetic recording and reproducing apparatus, it is possible to a magnetic field from a magnetic head can be applied to the magnetic layer 109 efficiently.

The soft magnetic under layer may be made of an amorphous alloy, and may be made of a microcrystalline or polycrystalline alloy. Further, the soft magnetic under layer may have a laminated structure having antiferromagnetic coupling with Ru interposed therein, and may have a single layer. Materials of the soft magnetic under layer includes CoFeB, CoFeZr, CoFeTa, CoFeTaZr, CoFeTaB, CoFeNi, CoNiTa, CoNiZr, CoZrB, CoTaZr, CoNbZr, FeAlSi, and the like.

Preferred materials of the soft magnetic under layer may include, specifically, a CoFe-based alloy (such as CoFeB, CoFeTa, CoFeTaZr, CoFeZr, and CoFeTaB), a CoFeNi-based alloy (such as CoFeNi, CoNiTa, and CoNiZr), a Co-based alloy (such as CoZr, CoTa, CoW, CoTi, CoMo, CoZrB, CoZrNb, CoTaZr, and CoTaMo), a Fe-based alloy (such as FeAlSi, FeB, FeZr, and FeSiB), and the like.

The magnetic layer 109 is a layer containing an alloy having an $L1_0$-type crystal structure as a main component. In order to achieve a high recording density, the magnetic layer 109 is preferably formed of magnetic particles of several nm which are segregated by a grain boundary segregation material, but becomes thermally unstable due to a small volume of the magnetic particle. For that reason, in the present embodiment, an alloy having an $L1_0$-type crystal structure with high magnetic anisotropy energy is used as a main component of the magnetic layer 109.

It is preferable that the magnetic layer 109 have an $L1_0$-type crystal structure, contain a FePt alloy or a CoPt alloy as a main component, and contain at least one selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C. The number of oxides ($SiO_2$, $TiO_2$, $Cr_2O_3$, $Al_2O_3$, $Ta_2O_5$, $ZrO_2$, $Y_2O_3$, $CeO_2$, MnO, TiO, and ZnO) or elements (C) to be used may be one, or may be two or more.

In the present embodiment, in order to control the size of the magnetic particle or interparticle exchange coupling, an additive can be contained as a segregation material in an alloy such as FePt or CoPt having an $L1_0$-type crystal structure. As the additive, at least one selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C is preferably used. The number of oxides ($SiO_2$, $TiO_2$, $Cr_2O_3$, $Al_2O_3$, $Ta_2O_5$, $ZrO_2$, $Y_2O_3$, $CeO_2$, MnO, TiO, and ZnO) or elements (C) to be used may be one, or may be two or more.

The magnetic layer 109 becomes a layer having a granular structure by containing such an additive. Therefore, it is possible to reduce the interparticle exchange coupling, to reduce the size of the magnetic particle, and to further enhance the SNR of the heat-assisted magnetic recording medium.

As a method of causing the magnetic layer 109 to take an $L1_0$-type crystal structure, there is a method of heating the substrate 101 having various types of under layers formed thereon to a temperature of 450 to 700° C., and epitaxially grow a FePt layer serving the magnetic layer 109. In the present embodiment, the FePt layer having an $L1_0$-type crystal structure exhibits a good (001) orientation by an orientation control effect of the under layer.

For this reason, the heat-assisted magnetic recording medium of the present embodiment exhibits a high coercive force and a high signal-to-noise ratio (SNR).

In the present invention, in order to further enhance the writing characteristics of the heat-assisted magnetic recording medium, a cap layer may be formed on the magnetic layer 109. As the cap layer, an alloy containing at least one of Co, Fe, and Ni as a main component can be used. The cap layer may include other additional elements in a range in which ferromagnetism is maintained at room temperature. As the cap layer, a crystalline alloy may be used, and an amorphous alloy may be used.

Protective Film

The protective film 110 is preferably made of a material having an excellent heat resistance, and a monolayered or multilayered carbon film or the like can be used as the protective film. As the carbon film, a film to which hydrogen, nitrogen, or a metal is added may be used. the carbon film can be formed by a CVD method or an ion beam method.

Lubricant Layer

As the lubricant layer 111, a liquid lubricant layer made of perfluoropolyether, or the like can be used.

In the heat-assisted magnetic recording medium of FIG. 1, the adhesion layer 102, the heat sink layer 103, the seed layer 104, the under layer 100, the magnetic layer 109, the protective film 110, and the lubricant layer 111 are formed on the substrate 101, but among these layers, components required for the magnetic recording medium of the present embodiment to realize a high coercive force and a high signal-to-noise ratio (SNR) are the under layer 100 and the magnetic layer 109.

[Microwave-Assisted Magnetic Recording Medium]

The magnetic recording medium of the present invention can also be applied to a microwave-assisted magnetic recording medium.

The microwave-assisted magnetic recording medium of an aspect of the present invention includes a medium in which, for example, a first under layer having a B2 structure or a BCC structure containing Cr as a main component, second and third under layers having a BCC structure, an upper under layer having a NaCl-type crystal structure, and a magnetic layer are laminated in this order on a substrate. The first under layer is preferably made of a Cr alloy having a BCC structure.

In the microwave-assisted magnetic recording medium of the present embodiment, as the under layers (first under layer, second under layer, third under layer, and upper under layer), and the magnetic layer, the same as those in the above-mentioned heat-assisted magnetic recording medium shown in FIG. 1 can be used.

In the microwave-assisted magnetic recording medium, the same structure as that of the heat-assisted magnetic recording medium shown in FIG. 1 may be used, but the medium surface is not heated, and thus a heat sink layer may not be included therein. For this reason, the microwave-assisted magnetic recording medium of the present embodiment can be formed to have a structure in which the heat sink layer 103 is removed from the magnetic recording medium shown in FIG. 1. That is, it is possible to adopt a structure in which the adhesion layer 102, the seed layer 104, the first under layer 105, the second under layer 106, the third under layer 107, the upper under layer 108, the magnetic layer 109, the protective film 110, and the lubricant layer 111 are formed on the substrate 101.

The microwave-assisted magnetic recording medium of the present embodiment can be formed to have a structure in which the heat sink layer 103 and the seed layer 104 are removed from the magnetic recording medium shown in FIG. 1, and the BCC under layer 105 (first under layer 105 having a BCC structure) is formed directly on the adhesion layer 102. That is, it is possible to adopt a structure in which the adhesion layer 102, the first under layer 105, the second under layer 106, the third under layer 107, the upper under layer 108, the magnetic layer 109, the protective film 110, and the lubricant layer 111 are formed on the substrate 101.

In such a microwave-assisted magnetic recording medium, as is the case with the above-mentioned heat-assisted magnetic recording medium shown in FIG. 1, the magnetic layer 109 containing an alloy having an $L1_0$-type crystal structure as a main component has a good (001) orientation. For this reason, the microwave-assisted magnetic recording medium of the present embodiment exhibits a high coercive force and a high signal-to-noise ratio (SNR).

Meanwhile, among the layers formed on the substrate 101, components required for the magnetic recording medium of the present embodiment to realize a high coercive force and a high signal-to-noise ratio (SNR) are the under layer 100 and the magnetic layer 109.

[Magnetic Recording and Reproducing Apparatus]

Figure 4:
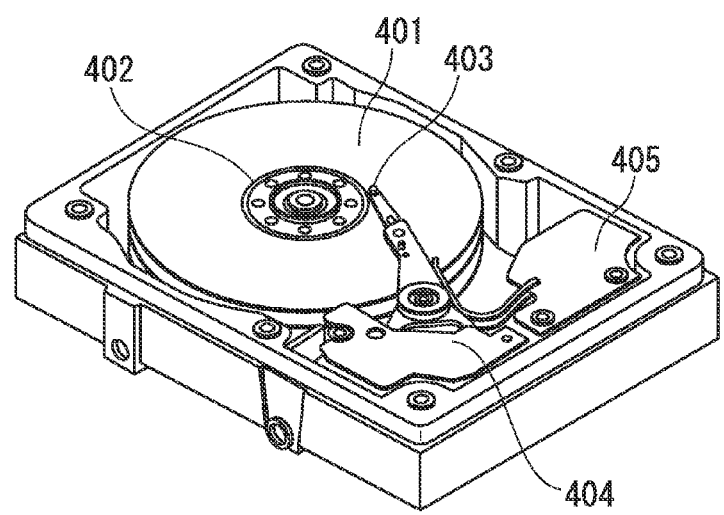
FIG. 4 is a perspective view illustrating an example of a magnetic recording and reproducing apparatus of the present invention.

Next, a magnetic recording and reproducing apparatus of an aspect of the present invention will be described. FIG. 4 is a perspective view illustrating an example of the magnetic recording and reproducing apparatus of the present invention, and FIG. 5 is a cross-sectional view schematically illustrating a configuration of a magnetic head included in the magnetic recording and reproducing apparatus shown in FIG. 4.

The magnetic recording and reproducing apparatus shown in FIG. 4 is schematically constituted by a magnetic recording medium 401 which is a heat-assisted magnetic recording medium of an aspect of the present invention, a medium driving portion 402 that rotates the magnetic recording medium 401 to drive the medium in a recording direction, a magnetic head 403 that performs a recording operation and a reproducing operation on the magnetic recording medium 401, a head driving portion 404 that moves the magnetic head 403 relative to the magnetic recording medium 401, and a recording and reproducing signal processing system 405 that performs signal input to the magnetic head 403 and reproduction of an output signal from the magnetic head 403.

Figure 5:
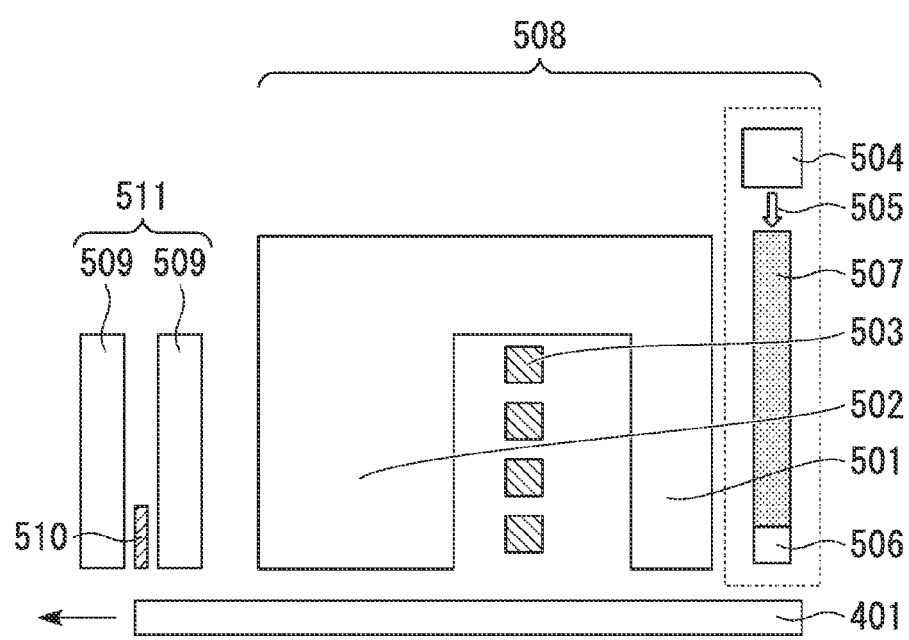
FIG. 5 is a diagram schematically illustrating a configuration of a magnetic head included in the magnetic recording and reproducing apparatus shown in FIG. 4.

The magnetic head 403 incorporated in the magnetic recording and reproducing apparatus shown in FIG. 4 is schematically constituted by a recording head 508 and a reproducing head 511, as shown in FIG. 5. The recording head 508 includes a main magnetic pole 501, an auxiliary magnetic pole 502, a coil 503 for generating a magnetic field, a laser diode (LD) 504, and a waveguide 507 that guides laser light 505 generated from the LD 504 to a near-field generating element 506 provided at the front end portion. The reproducing head 511 includes a reproduction element 510 such as a TMR element interposed between a pair of shields 509.

In the magnetic recording and reproducing apparatus shown in FIG. 4, the magnetic recording medium 401 is irradiated with near-field light generated from the near-field generating element 506 of the magnetic head 403, and magnetic information is written by locally heating the surface thereof and temporarily lowering a coercive force of the above-mentioned magnetic layer up to a head magnetic field or lower.

The magnetic recording and reproducing apparatus shown in FIG. 4 includes the magnetic recording medium 401 constituted by the heat-assisted magnetic recording medium of an aspect of the present invention which has a high coercive force and a high signal-to-noise ratio (SNR), and thus the error rate decreases.

[Magnetic Recording and Reproducing Apparatus (Another Example)]

Next, another example of the magnetic recording and reproducing apparatus of the present invention will be described.

The magnetic recording and reproducing apparatus of an aspect of the present invention may include a magnetic recording medium constituted by a microwave-assisted magnetic recording medium. Such a magnetic recording and reproducing apparatus includes, for example, an apparatus provided with a magnetic recording medium constituted by a microwave-assisted magnetic recording medium, a medium driving portion that drives the magnetic recording medium in a recording direction, an element that irradiates the magnetic recording medium with microwaves, a magnetic head that performs a recording operation and a reproducing operation on the magnetic recording medium, a head moving portion that moves the magnetic head relative to the magnetic recording medium, and a recording and reproducing signal processing system that performs signal input to the magnetic head and reproduction of an output signal from the magnetic head.

In the magnetic recording and reproducing apparatus provided with the magnetic recording medium constituted by the microwave-assisted magnetic recording medium, the magnetic recording medium is irradiated with microwaves from the microwave irradiation element, so that a magnetization direction is inclined from a magnetization easy axis by applying an alternating magnetic field of a microwave band to the magnetic layer of the magnetic recording medium, and magnetic information is written by the magnetic head by locally switching the magnetization of the magnetic layer.

Since such a magnetic recording and reproducing apparatus includes the magnetic recording medium constituted by the microwave-assisted magnetic recording medium of an aspect of the present invention which has a high coercive force and a high signal-to-noise ratio (SNR), an error rate is low, and excellent recording and reproducing characteristics are obtained.

EXAMPLES

Hereinafter, effects of the present invention will be described in detail through examples. Meanwhile, the following examples are representative examples suitably illustrating the magnetic recording medium of the present invention, and the present invention is not limited to these examples.

Examples 1-1 to 1-9

The heat-assisted magnetic recording medium shown in FIG. 1 was manufactured by the following method.

First, the adhesion layer 102 which has a thickness of 40 nm and which is made of Cr-50 at % Ti and the heat sink layer 103 which has a thickness of 25 nm and which is made of Ag were formed on the glass substrate 101 of 2.5 inches, and the seed layer 104 which has a thickness of 30 nm and which is made of Cr-50 at % Ti was further formed thereon.

The substrate 101 having the seed layer 104 formed thereon was heated up to a temperature of 260° C., and then the first under layer 105 which has a thickness of 15 nm and which is made of Cr-10 at % Nb and the second under layer 106 which has a thickness of 15 nm and which is made of Cr-50 at % Nb were formed. Continuously, the third under layer 107 which has a thickness of 15 nm and which is made of Nb-10 at % Cr and the upper under layer 108 (having a NaCl structure) which has a thickness of 3 nm and which is made of MgO were sequentially formed thereon.

Next, the substrate 101 having the upper under layer 108 formed thereon was heated up to a temperature of 650° C., and then the magnetic layer 109 which has a thickness of 8 nm and which is made of (Fe-50 at % Pt)-15 mol % $SiO_2$ was formed, the protective film 110 which has a thickness of 3.5 nm and which is made of diamond-like carbon (DLC (Diamond Like Carbon)) was formed, and the liquid lubricant layer 111 which has a thickness of 1.5 nm and which is made of perfluoropolyether was formed by application.

A heat-assisted magnetic recording medium of Example 1-1 was obtained by the following process.

Subsequently, the material of the first under layer 105 in the heat-assisted magnetic recording medium of Example 1-1 was replaced by materials shown in Table 1, and heat-assisted magnetic recording mediums of Examples 1-2 to 1-9 were created in the same manner as in Example 1-1 with respect to all other layers.

The lattice constant a of the second under layer 106 (Cr-50 at % Nb) of Examples 1-1 to 1-9 is 3.10 Å, and is in a range of 3.04 Å≤a<3.18 Å. In addition, the lattice constant a of the third under layer 107 (Nb-10 at % Cr) is 3.26 Å, and is in a range of 3.18 Å≤a<3.31 Å.

Both the second under layer 106 (Cr-50 at % Nb) and the third under layer 107 (Nb-10 at % Cr) have a BCC structure.

When the X-ray diffraction measurement of the obtained heat-assisted magnetic recording medium of Example 1-1 was performed, a mixed peak of $L1_0$-FePt (001), and $L1_0$-FePt (002) and FCC-FePt (200) was confirmed. In addition, the first under layer 105 made of Cr-10 at % Nb, the second under layer 106 made of Cr-50 at % Nb formed thereon, and the third under layer 107 made of Nb-10 at % Cr exhibited a (100) orientation.

Regarding the heat-assisted magnetic recording mediums of Examples 1-1 to 1-9, coercive forces, signal-to-noise ratios (SNR) of electromagnetic conversion characteristics, and surface roughness (Ra) were measured by the following method. The results are shown in Table 1.

The coercive force was measured by applying a magnetic field of 7T at room temperature using a physical property measurement system (PPMS). In addition, the SNR measurement of electromagnetic conversion characteristics was performed by a spin-stand tester using a head on which a laser spot heating mechanism is mounted, a laser diode (LD) input voltage was adjusted so that a recording track width defined as the half-value width of a truck profile was set to 70 nm, and the SNR in a case of the track width was confirmed. Further, the surface roughness (Ra) was measured at a field of view of 10 μm using a tapping mode of AFM manufactured by Veeco Instruments Inc.

Examples 1-1 to 1-7 in which the first under layer 105 is made of Cr or an alloy containing Cr as a main component, has a BCC structure, and the lattice constant a thereof is in a range of 2.87 Å≤a<3.04 Å exhibited a good coercive force and a high SNR. In addition, Examples 1-8 and 1-9 using RuAl or NiAl having a B2 structure also exhibited a good coercive force and a high SNR.

From this, the first under layer 105 has a BCC structure containing Cr as a main component or a B2 structure, thereby allowing a medium having a good coercive force and SNR to be provided.

In Examples 1-1 to 1-7, it is known that a small addition amount of elements added to Cr exhibits a good coercive force and SNR. This is considered because the orientation of pure Cr is the best.

Among Examples 1-1 to 1-7, an example having a small addition amount of additional elements tends to have a slightly higher SNR than an example having a large addition amount, and also tends to have slightly higher surface roughness Ra. From this, the type of the first under layer can be selected in accordance with demand characteristics required for the magnetic recording medium.

TABLE 1

|  | First Under Layer | Lattice Constant (Å) | Hc (kOe) | SNR (dB) | Ra (nm) |
|---|---|---|---|---|---|
| Example 1-1 | Cr—10Nb | 2.93 | 34.6 | 14.1 | 0.25 |
| Example 1-2 | Cr—10Ru | 2.89 | 34.7 | 14.0 | 0.24 |
| Example 1-3 | Cr | 2.88 | 35.2 | 14.3 | 0.25 |
| Example 1-4 | Cr—15W | 2.93 | 34.3 | 14.0 | 0.24 |
| Example 1-5 | Cr—10Mo—5V | 2.92 | 33.9 | 13.8 | 0.25 |
| Example 1-6 | Cr—10Mn | 2.94 | 34.0 | 13.8 | 0.24 |
| Example 1-7 | Cr—10Ta—5Ti | 2.95 | 33.5 | 13.7 | 0.24 |
| Example 1-8 | Ru—50Al | 3.03 | 34.9 | 14.5 | 0.30 |
| Example 1-9 | Ni—50Al | 2.88 | 33.4 | 14.4 | 0.27 |

Comparative Examples 1-1 to 1-7

The first under layer in the heat-assisted magnetic recording medium of Example 1-1 is replaced by materials shown in Table 2, and heat-assisted magnetic recording mediums of Comparative Examples 1-1 to 1-7 were created in the same manner as in Example 1-1 with respect to all other layers. Regarding the heat-assisted magnetic recording mediums of Comparative Examples 1-1 to 1-7, results obtained by measuring the coercive forces and the SNRs were shown in Table 2.

TABLE 2

|  | First Under Layer | Lattice Constant (Å) | Hc (kOe) | SNR (dB) | Ra (nm) |
|---|---|---|---|---|---|
| Comparative Example 1-1 | Mo—10Cr | 3.12 | 15.7 | 8.8 | 0.24 |
| Comparative Example 1-2 | W—20V | 3.14 | 15.4 | 8.3 | 0.24 |
| Comparative Example 1-3 | Ta | 3.30 | 16.2 | 9.1 | 0.23 |
| Comparative Example 1-4 | Nb—50Mo | 3.23 | 14.9 | 8.2 | 0.24 |
| Comparative Example 1-5 | Ru—10Ti | 3.10 | 15.3 | 8.7 | 0.25 |
| Comparative Example 1-6 | V—10Mn | 3.03 | 14.5 | 8.0 | 0.24 |
| Comparative Example 1-7 | — | — | 24.1 | 10.5 | 0.24 |

Both the coercive forces and the SNRs in Comparative Examples 1-1 to 1-7 considerably deteriorate as compared to those in Examples 1-1 to 1-9. Since the first under layer of the mediums of Comparative Example 1-1 to 1-6 is not made of an alloy containing Cr as a main component, the first under layer is not (100)-oriented, and the second under layer and the third under layer which are formed thereon are also not (100)-oriented. For that reason, it is considered that an orientation control function of the under layer is not sufficiently obtained, and the orientation of the magnetic layer also deteriorates. On the other hand, since Comparative Example 1-7 which is not provided with the first under layer has no orientation control function of the first under layer, and the orientation control effect of the second under layer is also insufficient, it is considered that both the coercive force and the SNR are not good.

Examples 2-1 to 2-7

Figure 2:
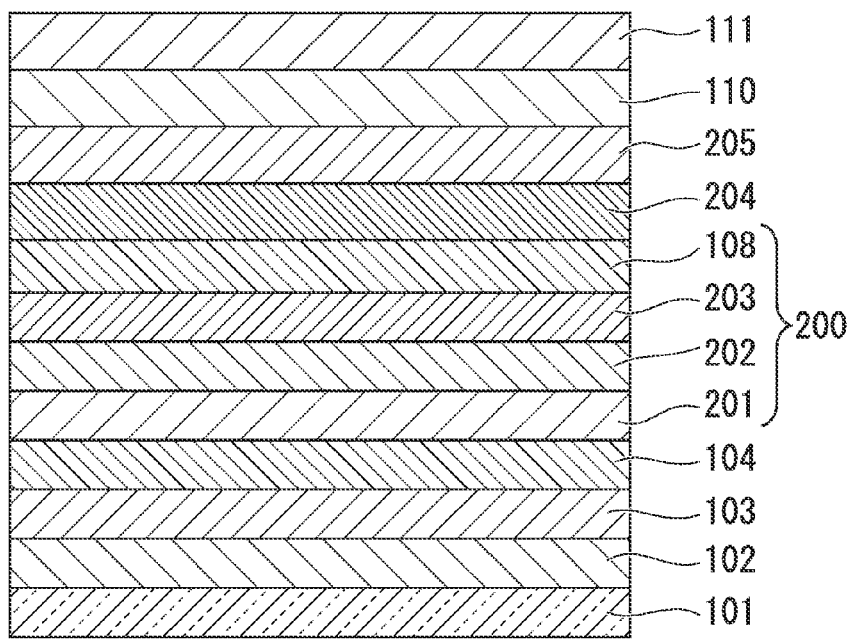
FIG. 2 is a cross-sectional view illustrating another example of the heat-assisted magnetic recording medium of the present invention.

A heat-assisted magnetic recording medium shown in FIG. 2 was manufactured.

The first under layer 105 in the magnetic recording medium of Example 1-1 was replaced by a first under layer 201 made of Cr, the second under layer 106 was replaced by a second under layer 202 made of Mo-30 at % Cr, and the third under layer 107 was replaced by a third under layer 203 made of W-20 at % Ta.

Further, the magnetic layer 109 was replaced by a magnetic layer 204 (which has an $L1_0$-type crystal structure) which has a film thickness of 7.5 nm and which is made of (Fe-48 at % Pt)-5 at % Ag-35 mol % C, and a cap layer 205 which has a film thickness of 1.5 nm and which is made of Co-10 at % Ta-5 at % B was formed on the magnetic layer 204. A magnetic recording medium of example 2-1 was created in the same manner as in Example 1-1 with respect to all other layers.

In FIG. 2, the first to third under layers 201 to 203 and the upper under layer 108 are collectively called an under layer 200.

The material of the second under layer 202 in the heat-assisted magnetic recording medium of example 2-1 was replaces by materials shown in Table 3. Magnetic recording mediums of examples 2-2 to 2-7 were created in the same manner as in example 2-1 with respect to all other layers.

The lattice constant a of the first under layer 201 (Cr) of examples 2-1 to 2-7 is 2.88 Å, and is in a range of 2.87 Å≤a<3.04 Å. In addition, the lattice constant a of the third under layer 203 (W-20 at % Ta) is 3.19 Å, and is in a range of 3.18 Å≤a<3.31 Å.

The first to third under layers 201, 202, and 203 of examples 2-1 to 2-7 all have a BCC structure.

Results obtained by measuring the coercive forces and the SNRs of these magnetic recording mediums are shown in Table 3.

TABLE 3

|  | Second Under Layer | Lattice Constant (Å) | Hc (kOe) | SNR (dB) |
|---|---|---|---|---|
| Example 2-1 | Mo—30Cr | 3.07 | 29.2 | 15.3 |
| Example 2-2 | Mo—10Cr—10Ru | 3.11 | 28.7 | 15.2 |
| Example 2-3 | Mo—5Ta—5Ti | 3.16 | 29.5 | 15.7 |
| Example 2-4 | W—20Cr | 3.11 | 28.9 | 15.4 |
| Example 2-5 | W | 3.17 | 29.0 | 15.7 |
| Example 2-6 | W—10Mn | 3.16 | 28.9 | 15.5 |
| Example 2-7 | V—20Nb | 3.08 | 28.6 | 15.0 |

The magnetic recording mediums shown in examples 2-1 to 2-7 exhibited the coercive force and the SNR having a high value. This is considered because a misfit between the under layer is reduced by gradually increasing the lattice constant of the under layer, and the orientation thereof is improved.

Comparative Examples 2-1 to 2-5

The second under layer in example 2-1 was replaced by materials shown in Table 4, and magnetic recording mediums of Comparative Examples 2-1 to 2-5 were created. The values of the coercive forces and the SNRs of these magnetic recording mediums are shown in Table 4.

The coercive forces and the SNRs of Comparative Examples 2-1 to 2-5 are lower than the values of the magnetic recording mediums of Examples 1-1 to 1-9. Since the second under layer of the mediums of Comparative Examples 2-1 to 2-3 has a small lattice constant, it is considered that the lattice misfit of the second under layer and the third under layer becomes large, and the coercive force and the SNR deteriorate. On the other hand, since the second under layer of the mediums of Comparative Examples 2-4 and 2-5 has a large lattice constant, it is considered that the lattice misfit of the first under layer and the second under layer becomes large, and the coercive force and the SNR deteriorate.

TABLE 4

| | Second Under Layer | Lattice Constant (A) | Hc (kOe) | SNR (dB) |
|---|---|---|---|---|
| Comparative Example 2-1 | Cr—10Nb | 2.91 | 22.7 | 11.6 |
| Comparative Example 2-2 | V—30Ru | 3.04 | 22.2 | 11.3 |
| Comparative Example 2-3 | Cr—20Mo | 2.94 | 23.4 | 12.2 |
| Comparative Example 2-4 | Nb—30Ti | 3.31 | 19.5 | 10.1 |
| Comparative Example 2-5 | Ta—10W—10Mn | 3.26 | 20.6 | 10.5 |

Examples 3-1 to 3-7

Figure 3:
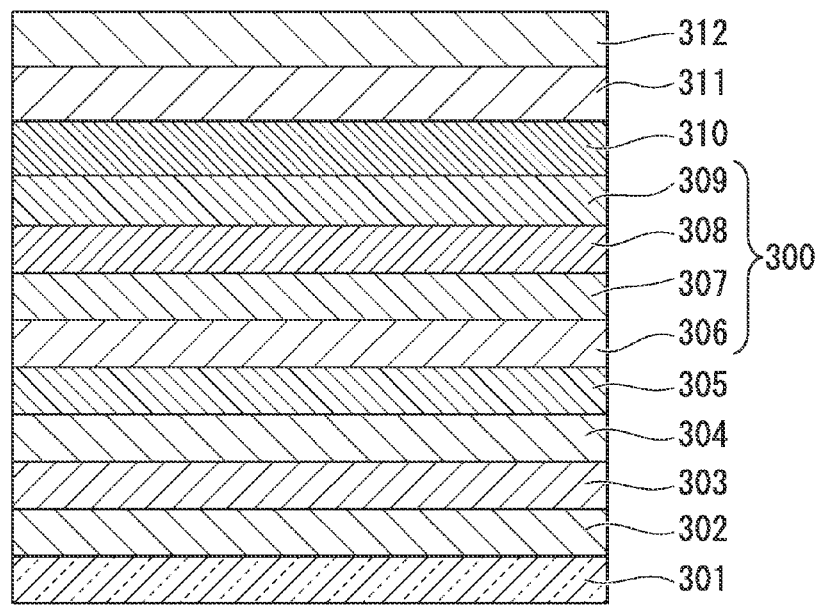
FIG. 3 is a cross-sectional view illustrating another example of the heat-assisted magnetic recording medium of the present invention.

A heat-assisted magnetic recording medium shown in FIG. 3 was created by the following method.

An adhesion layer 302 which has a thickness of 40 nm and which is made of Ni-50 at % Ta was formed on a glass substrate 301 of 2.5 inches, and continuously, a heat sink layer 303 which has a thickness of 35 nm and which is made of Cu was formed thereon. Further, a soft magnetic layer 304 which has a thickness of 30 nm and which is made of Fe-20 at % Al-5 at % Si was formed on the heat sink layer 303, and a seed layer 305 which has a thickness of 15 nm and which is made of Cr-50 at % Ti was formed thereon.

The substrate 301 which has the adhesion layer 302 to the seed layer 305 formed thereon was heated up to a temperature of 280° C., and then a first under layer 306 which has a thickness of 10 nm and which is made of Cr-10 at % Mo and a second under layer 307 which has a thickness of 10 nm and which is made of Mo-10 at % Cr were formed. continuously, a third under layer 308 which has a thickness of 15 nm and which is made of Ta-20 at % Cr and an upper under layer 309 (having a NaCl structure) which has a thickness of 5 nm and which is made of TiN were further formed sequentially thereon.

Next, the substrate 301 which has the adhesion layer 302 to the upper under layer 309 formed thereon was heated up to a temperature of 680° C., an then a magnetic layer 310 which has a thickness of 9 nm and which is made of (Fe-53 at % Pt)-18 mol % $TiO_2$ was formed, a protective film 311 which has a thickness of 3.5 nm and which is made of diamond-like carbon (DLC (Diamond Like Carbon)) was formed, and a liquid lubricant layer 312 which has a thickness of 1.5 nm and which is made of perfluoropolyether was formed by application.

A magnetic recording medium of Example 3-1 was obtained by the following process.

In FIG. 3, the first to third under layers 306 to 308 and the upper under layer 309 are collectively called an under layer 300.

In addition, the third under layer 308 in the heat-assisted magnetic recording medium of Example 3-1 was replaced by materials shown in Table 5, and magnetic recording mediums of Examples 3-2 to 3-7 were created in the same manner as in Example 3-1 with respect to all other layers.

The lattice constant a of the first under layer 306 (Cr-10 at % Mo) of Examples 3-1 to 3-7 is 2.91 Å, and is in a range of 2.87 Å≤a<3.04 Å. The lattice constant a of the second under layer 307 (Mo-10 at % Cr) is 3.12 Å, and is in a range of 3.04 Å≤a<3.18 Å. The first to third under layers 306, 307, and 308 of Examples 3-1 to 3-7 all have a BCC structure.

Regarding the magnetic recording mediums of Examples 3-1 to 3-7, the coercive forces and the SNRs thereof were measured. The results are shown in Table 5.

TABLE 5

| | Third Under Layer | Lattice Constant (A) | Hc (kOe) | SNR (dB) |
|---|---|---|---|---|
| Example 3-1 | Ta—20Cr | 3.22 | 33.6 | 14.5 |
| Example 3-2 | W—20Nb | 3.19 | 33.1 | 14.5 |
| Example 3-3 | Nb—30Mo | 3.26 | 32.3 | 14.1 |
| Example 3-4 | W—30Ta—5Cr | 3.19 | 32.9 | 14.3 |
| Example 3-5 | Ta | 3.30 | 32.5 | 13.8 |
| Example 3-6 | Nb—10V—10Ru | 3.26 | 32.4 | 13.9 |
| Example 3-7 | Ta—5Ti—5Mn | 3.29 | 31.8 | 13.7 |

The magnetic recording mediums of Examples 3-1 to 3-7 all exhibited a high coercive force and SNR.

From the results, it is known that an alloy obtained by adding Cr, Mo, Ru, V, Mn, Ti or the like, using an element, such as Ta, W, or Nb, which has a relatively large lattice constant as a main component is preferably used in the third under layer.

Comparative Examples 3-1 to 3-6

The third under layer in Example 3-1 was replaced by materials shown in Table 6, magnetic recording mediums shown in comparative Examples 3-1 to 3-5 were created, and the values of the coercive forces and the SNR were confirmed. The results are shown in Table 4.

The coercive force and the SNR in the magnetic recording mediums of comparative Examples 3-1 to 3-5 become lower than those in Example 3. This is considered because the lattice constant of an alloy for forming the third under layer is small, and in-plane stress is applied to the upper under layer 309.

TABLE 6

| | Third Under Layer | Lattice Constant (A) | Hc (kOe) | SNR (dB) |
|---|---|---|---|---|
| Comparative Example 3-1 | V—20Mn | 3.03 | 18.7 | 9.5 |
| Comparative Example 3-2 | Cr | 2.88 | 19.9 | 9.8 |
| Comparative Example 3-3 | Mo—10Cr—10Ti | 3.16 | 24.6 | 11.7 |
| Comparative Example 3-4 | V—20Nb | 3.08 | 21.7 | 10.4 |
| Comparative Example 3-5 | Cr—15Ru—15Ta | 2.97 | 20.8 | 10.0 |

Examples 4

The heat-assisted magnetic recording mediums of Examples 1-1 to 1-3, 1-8, 2-1, 2-4, 2-5, and 3-1 to 3-4, and Comparative Examples 1-1, 1-3, 1-5, 2-1, 2-3, 3-1, and 3-4 were used as the magnetic recording medium of the magnetic recording and reproducing apparatus shown in FIG. 4, and an error rate was measured.

The error rate was recorded and measured under the conditions of a track recording density of 1600 kFCI and a track density of 500 kFCI (surface recording density of 800 Gbit/inch$^2$).

As a result, the magnetic recording apparatus obtained by incorporating the magnetic recording medium of Examples 1-1 to 1-3, 1-8, 2-1, 2-4, 2-5, and 3-1 to 3-4 exhibited a low error rate of equal to or less than $1\times10^{-6}$. In addition, the error rate of the magnetic recording and generating apparatus obtained by incorporating the magnetic recording medium of Comparative Examples 1-1, 1-3, 1-5, 2-1, 2-3, 3-1, and 3-4 was approximately $1\times10^{-4}$ to $1\times10^{-3}$.

As stated above, it was known that a magnetic recording and reproducing apparatus having a low error rate was obtained by using a magnetic recording medium in which an under layer formed on the substrate and a magnetic layer containing an alloy as a main component which has an $L1_0$-type crystal structure formed on the under layer are included, the under layer includes, in order from the substrate side, a first under layer with a lattice constant a of $2.87\ \text{Å}\le a<3.04\ \text{Å}$, a second under layer having a BCC structure with a lattice constant a of $3.04\ \text{Å}\le a<3.18\ \text{Å}$, a third under layer having a BCC structure with a lattice constant a of $3.18\ \text{Å}\le a<3.31\ \text{Å}$, and an upper under layer having a NaCl structure, and the first under layer has a B2 structure, or having a BCC structure containing Cr as a main component.

According to the present invention, it is possible to provide a magnetic recording medium exhibiting a high coercive force and a high signal-to-noise ratio (SNR) and a magnetic recording and reproducing apparatus provided therewith.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A magnetic recording medium comprising:
   an under layer formed on a substrate; and
   a magnetic layer, formed on the under layer, which contains an alloy having an $L1_0$-type crystal structure as a main component,
   wherein the under layer includes, in order from the substrate side,
   a first under layer with a lattice constant a of $2.87\ \text{Å}\le a<3.04\ \text{Å}$,
   a second under layer having a BCC structure with a lattice constant a of $3.04\ \text{Å}\le a<3.18\ \text{Å}$,
   a third under layer having a BCC structure with a lattice constant a of $3.18\ \text{Å}\le a<3.31\ \text{Å}$, and
   an upper under layer having a NaCl-type crystal structure,
   the first under layer has a B2 structure, or has a BCC structure containing Cr as a main component, and
   information is recorded using a heat-assisted magnetic recording type or a microwave-assisted magnetic recording type.

2. The magnetic recording medium according to claim 1, wherein the first under layer is made of Cr and has a BCC structure, or contains Cr as a main component, and contains at least one of Ti, V, Mo, W, Nb, Ta, Mn, and Ru, and has a BCC structure.

3. The magnetic recording medium according to claim 1, wherein the first under layer contains NiAl or RuAl, and has a B2 structure.

4. The magnetic recording medium according to claim 1, wherein the second and third under layers contain Cr, Mo, Nb, Ta, V, or W; or contain Cr, Mo, Nb, Ta, V, or W as a main component, and contain at least one of Cr, Ti, V, Mo, W, Nb, Ta, Mn, and Ru.

5. The magnetic recording medium according to claim 1, wherein the magnetic layer has an $L1_0$-type crystal structure, contains a FePt alloy or a CoPt alloy as a main component, and contains at least one selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C.

6. A magnetic recording and reproducing apparatus comprising:
   the magnetic recording medium according to claim 1;
   a medium driving portion that drives the magnetic recording medium in a recording direction;
   a magnetic head that includes a laser generation portion which heats the magnetic recording medium, a waveguide which guides laser light generated from the laser generation portion to a front end portion, and a near-field generating element provided at the front end portion, and performs a recording operation and a reproducing operation on the magnetic recording medium;
   a head moving portion that moves the magnetic head relative to the magnetic recording medium; and
   a recording and reproducing signal processing system that performs signal input to the magnetic head and reproduction of an output signal from the magnetic head.

7. A magnetic recording and reproducing apparatus comprising:
   the magnetic recording medium according to claim 1;
   a medium driving portion that drives the magnetic recording medium in a recording direction;
   an element that irradiates the magnetic recording medium with microwaves;
   a magnetic head that performs a recording operation and a reproducing operation on the magnetic recording medium;
   a head moving portion that moves the magnetic head relative to the magnetic recording medium; and
   a recording and reproducing signal processing system that performs signal input to the magnetic head and reproduction of an output signal from the magnetic head.

* * * * *